United States Patent
Zhang et al.

(10) Patent No.: US 9,444,643 B2
(45) Date of Patent: Sep. 13, 2016

(54) IP MULTICAST OVER SPLIT PLANE WIRELESS LAN

(71) Applicant: Avaya, Inc., Basking Ridge, NJ (US)

(72) Inventors: Debin Zhang, Westford, MA (US); Vijay Mulamalla, Nashua, NH (US); Lava Lavu, Bedford, MA (US)

(73) Assignee: Avaya, Inc., Basking Ridge, NJ (US)

( * ) Notice: Subject to any disclaimer, the term of this patent is extended or adjusted under 35 U.S.C. 154(b) by 241 days.

(21) Appl. No.: 13/628,108

(22) Filed: Sep. 27, 2012

(65) Prior Publication Data
US 2014/0086133 A1 Mar. 27, 2014

(51) Int. Cl.
*H04L 12/46* (2006.01)
*H04L 12/18* (2006.01)

(52) U.S. Cl.
CPC ......... *H04L 12/4641* (2013.01); *H04L 12/189* (2013.01)

(58) Field of Classification Search
USPC ........................................ 370/312, 390, 432
See application file for complete search history.

(56) References Cited

U.S. PATENT DOCUMENTS

| | | | |
|---|---|---|---|
| 2010/0293043 A1* | 11/2010 | Atreya et al. | 705/14.4 |
| 2011/0058551 A1* | 3/2011 | Fernandez Gutierrez | H04L 12/185 370/390 |

OTHER PUBLICATIONS

Cain et al., Internet Group Management Protocol, Version 3—RFC 3376, Oct. 2002, IETF, 53 pages.*

* cited by examiner

*Primary Examiner* — Hoon J Chung

(57) ABSTRACT

A method, apparatus and computer program product for providing IP multicast over split plane wireless LAN. An access tunnel (AT) is defined as an IP multicast interface at a first network device. The AT is capable of communicating with a second network device that is an Internet Protocol (IP) multicast receiver, wherein a local Virtual Local Area Network (VLAN) the first device serves the second network device's mobility VLAN. The first network device sends a query to the second network device over the AT and receiving, in response to the sending the query, a report. A data structure is built defining a multicast group membership from the report, and multicast data is forwarded in accordance with the data structure.

17 Claims, 5 Drawing Sheets

IP MULTICAST OVER SPLIT PLANE WIRELESS LAN

BACKGROUND

In computer networking, the term "multicast" refers to the delivery of a message or information to a group of destination computers simultaneously in a single transmission from the source creating copies automatically in other network elements, such as routers, only when the topology of the network requires it. Multicast is most commonly implemented in Internet Protocol (IP) multicast, which is often employed in IP applications of streaming media and Internet television. In IP multicast the implementation of the multicast concept occurs at the IP routing level, where routers create optimal distribution paths for datagrams sent to a multicast destination address. At the Data Link Layer, multicast describes one-to-many distribution such as Ethernet multicast addressing, Asynchronous Transfer Mode (ATM) point-to-multipoint virtual circuits (P2MP) or Infiniband multicast.

Shortest Path Bridging (SPB) is a transport network protocol that provides logical Ethernet networks on native Ethernet infrastructure using a link state protocol to advertise both topology and logical network membership. Packets are encapsulated at the edge of an SPB network either in mac-in-mac 802.1 ah or tagged 802.1 Q/802.1 ad frames and transported only to other members of the logical network. Unicast and multicast are supported and all routing is on symmetric shortest paths. Many equal cost shortest paths are supported.

Wireless LAN (WLAN) is a technology that extends Local Area Network (LAN) to wireless users. The prevailing WLAN technology today is so-called Overlay WLAN model, in which wireless radio signal terminates in Access Points (APs), and then wireless data is passed to Wireless Controllers (WCs) where data packets are brought into LAN. In this model, WCs contain both wireless network control and data forwarding information, and behave as both network controllers and data forwarders.

One embodiment of a Wireless LAN Split Plane technology separates the wireless LAN control and data forwarding functionality. While keeping the control functions in WCs, the forwarding task is offloaded to Wireless Switching Points (WSPs), which normally are integrated into traditional switches and routers. By separating control and switching functionalities, WLAN network switching bottlenecks are removed and performance is greatly improved. Therefore, it is superior solution compared to the traditional Overlay WLAN model.

One of the technical challenge of the WLAN Split Plane solution is to support wireless IP multicast functions. The initial Split Plane IP multicast solution was based on IGMP snooping as part of the Protocol Independent Multicast (PIM) protocol.

PIM is a multicast routing protocol for Internet Protocol (IP) networks that provide one-to-many and many-to-many distribution of data over a LAN, WAN or the Internet. It is termed protocol-independent because PIM does not include its own topology discovery mechanism, but instead uses routing information supplied by other traditional routing protocols such as, Open Shortest Path First (OSPF), Border Gateway Protocol (BGP) and the like. One version of PIM is Protocol Independent Multicast—Sparse Mode (PIM-SM) which can use the underlying unicast routing information base or a separate multicast-capable routing information base. PIM-SM is a protocol for efficiently routing Internet Protocol (IP) packets to multicast groups that may span wide-area and inter-domain Internets. The protocol is named protocol-independent because it is not dependent on any particular unicast routing protocol for topology discovery, and sparse-mode because it is suitable for groups where a very low percentage of the nodes (and their routers) will subscribe to the multicast session. Unlike earlier dense-mode multicast routing protocols such as DVMRP and dense multicast routing which flooded packets across the network and then pruned off branches where there were no receivers, PIM-SM explicitly constructs a tree from each sender to the receivers in the multicast group. PIM-SM builds unidirectional shared tree rooted at a Rendezvous Point (RP) per group and optionally creates shortest-path trees per source. PIM-SM works in traditional IP networks. PIM-SM traditionally is not defined or extended over SPB networks as conventional SPB networks have no knowledge of rendezvous points or rooted multicast if users are running a PIM based IP multicast network, WSPs have to depend on an external device running PIM to integrate the WSP into PIM networks.

Another version of PIM is known as PIM source specific multicast (PIM-SSM). PIM-SSM builds trees that are routed in a single source. In PIM-SS, an IP datagram is transmitted by a source (S) to an SSM destination address (G). Receivers can receive the datagram by subscribing to channel (S,G). The term PIM is used herein to refer to either or both of PIM-SM and PIM-SSM.

Normally the external PIM boxes work as IGMP queriers. To be more specific, if a WSP is a Mobility VLAN server, the VLAN that serves mobility needs to have IGMP snoop turned on. If that is a PIM network, then the WSP needs to connect to other switches/routers, which have PIM enabled, to bring it into PIM networks.

A majority of enterprise customers deploy PIM based IP multicast network. This invention provides a method that integrates WLAN split Plane solution with existing IP Multicast PIM technology on WSPs without the need of deploying extra PIM routers in the network. This helps PIM users to lower their network deployment cost.

SUMMARY

Conventional mechanisms such as those explained above suffer from a variety of deficiencies. It is accordingly an object of the invention to eliminate or alleviate at least some of the problems referred to above. The presently described IP multicast over split plane wireless LAN provides a solution that enables Split Plane Wireless LAN technology to work seamlessly on existing PIM based IP multicast networks without the need of additional external PIM routers.

In a particular embodiment of a method for providing IP multicast over split plane wireless LAN the method includes defining, at a first network device, an access tunnel (AT) as an IP multicast interface, the AT capable of communicating with a second network device that is an Internet Protocol (IP) multicast receiver, wherein a local Virtual Local Area Network (VLAN) the first device serves the second network device's mobility VLAN. The method further includes sending, by the first network device, a query to the second network device over the AT and receiving, in response to the sending the query, a report. The method also includes building a data structure defining a multicast group membership from the report.

Other embodiments include a computer readable medium having computer readable code thereon for providing IP multicast over split plane wireless LAN. The computer readable medium includes instructions for defining, at a first network device, an access tunnel (AT) as an IP multicast interface, the AT capable of communicating with a second network device that is an Internet Protocol (IP) multicast receiver, wherein a local Virtual Local Area Network (VLAN) the first device serves the second network device's mobility VLAN. The computer readable medium further includes instructions for sending, by the first network device, a query to the second network device over the AT and receiving, in response to the sending the query, a report. The computer readable medium also includes instructions for building a data structure defining a multicast group membership from the report.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides IP multicast over split plane wireless LAN as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing IP multicast over split plane wireless LAN as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
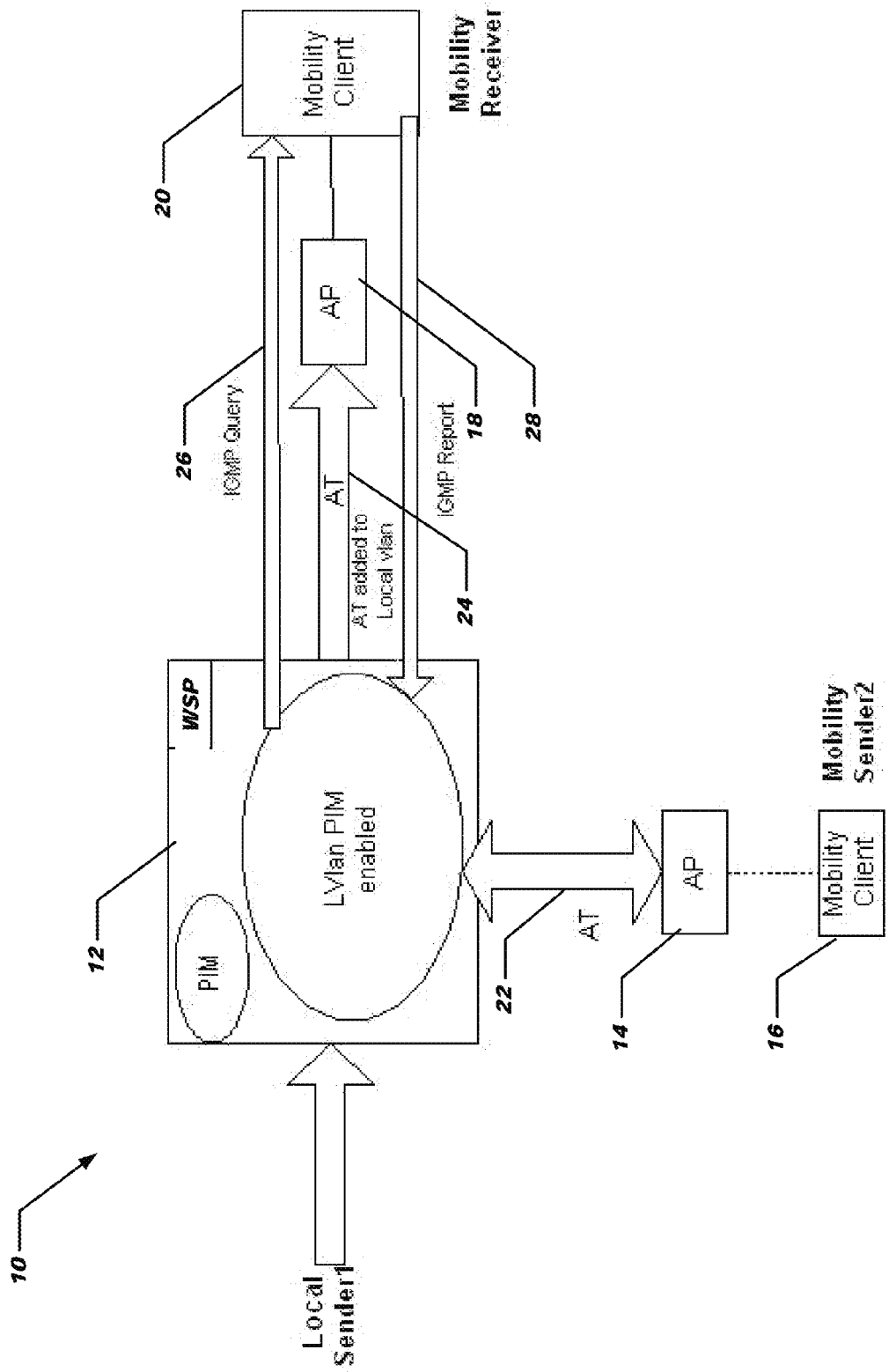
FIG. 1 depicts a block diagram of a first environment for providing IP multicast on a WLAN in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

With this proposed IP multicast solution based on a Split Plane WLAN technology, a wireless network is brought into PIM based multicast network via one of the following two scenarios.

A first scenario is shown in FIG. 1. Referring now to FIG. 1, a first environment 10 for providing IP multicast over split plane wireless LAN is shown. In this environment 10 a wireless client 20, who is an IP multicast receiver, is connected, via Access Tunnel (AT) 24, to a WSP 12 which serves the wireless client's mobility VLAN. In this case, the local VLAN that serves the wireless client's mobility VLAN, can have PIM turned on. The AT 24 is treated as an IP multicast interface, and IGMP queries 26 are sent out via AT 24 to wireless client 20. Upon receiving the IGMP queries 26, wireless client 20 will send IGMP reports 28 to WSP 12 via AT 24, so that multicast group membership will be built on AT interfaces. The querier actions are referred to as snooping. Snooping maps links to IP multicast streams so only links that need the multicast streams get the multicast streams instead of flooding the entire network. Accordingly, multicast data provided by mobility client 16 via AP 14 through AT 22 to WSP 12 can be provided to mobility client 20 via AP 18 through AT 24 without the need to have a device external to WSP 12 running PIM.

Figure 2:
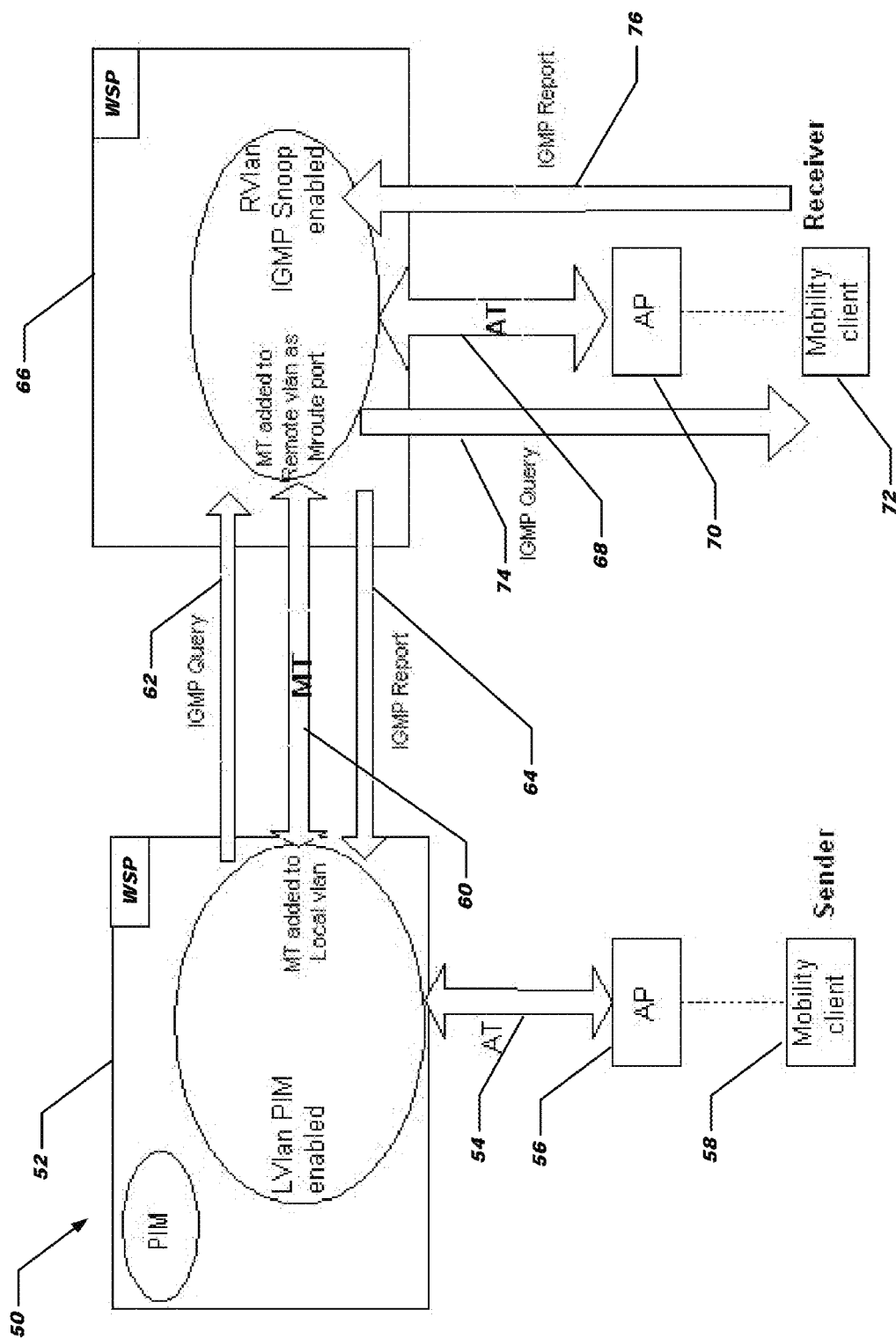
FIG. 2 depicts a block diagram of a second environment for providing IP multicast on a WLAN in accordance with embodiments of the invention.

A second scenario is shown in FIG. 2. FIG. 2 shows environment 50 where a wireless client 72, who is an IP multicast receiver, has roamed to a remote network, in which the local WSP 66 is not the wireless client's mobility VLAN server. In this case, the local WSP 66 does not have information to process the mobility client's data. Therefore, it passes mobility client's packets back to the WSP 52, which serves the mobility client's mobility VLAN, via Mobility Tunnel (MT) 60. Mobility tunnels are the tunnels built between each WSP pair. Here the MT 60 is built between WSP 66 and WSP 52. The local WSP 66 dynamically creates a Remote Vlan (RV), and adds AT 68 and MT 60 as members of the remote VLAN. Then IGMP snoop will be automatically enabled on that remote VLAN. The VLAN on the mobility VLAN server 52, which is at the other end of the MT 60, has PIM turned on. The MT 60 is treated as an IP multicast leaf interface, and IGMP queries will be sent out to Remote Vlan via MT 60. On the Remote Vlan side, the MT 60 is set as multicast router port, to which all the mobility clients' IGMP report information will be sent by Remote Vlan, so that the mobility VLAN server 52, which runs PIM, will know there are receivers sitting at the other end of MT 60. The Remote Vlan will also relay IGMP queries, received from mobility VLAN server via MT 56, to mobility clients 72, so that mobility clients can periodically update their multicast receiver information to PIM running mobility VLAN server. Accordingly, multicast data provided by mobility client 58 via AP 56 through AT 54 to WSP 52 can be provided via MT 60 and WSP 66 to mobility client 72 through AT 60 via AP 70 without the need to have a device external to WSP 66 running PIM.

Figure 3B:
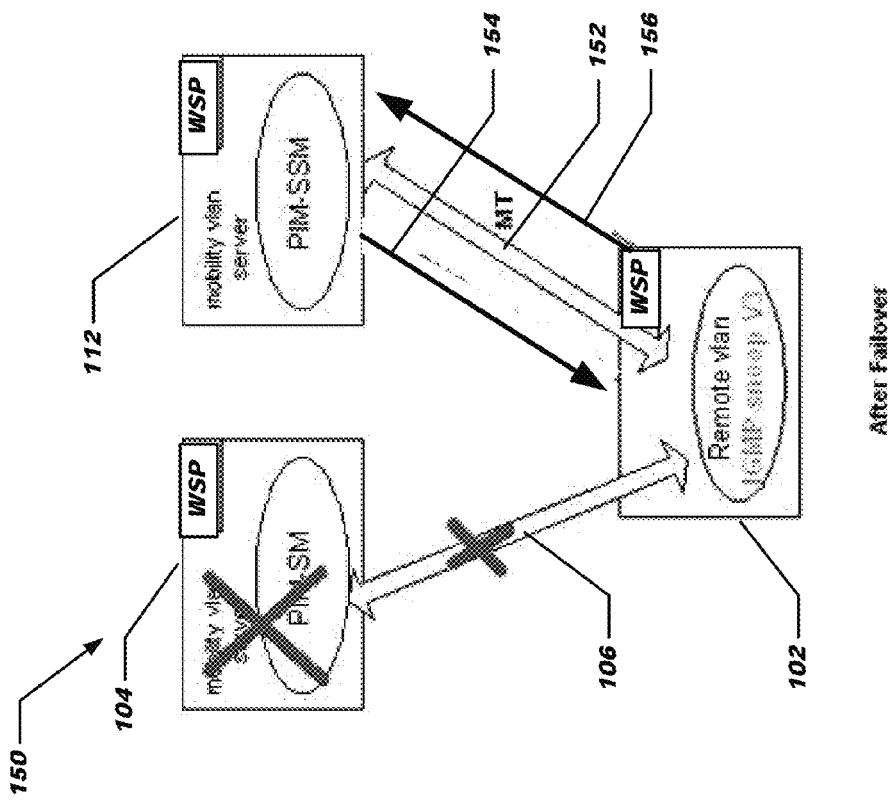
FIGS. 3A and 3B depicts a block diagram of an environment for providing automatic adjustment of an IGMP snoop version on a remote VLAN in accordance with embodiments of the invention.
Figure 3A:
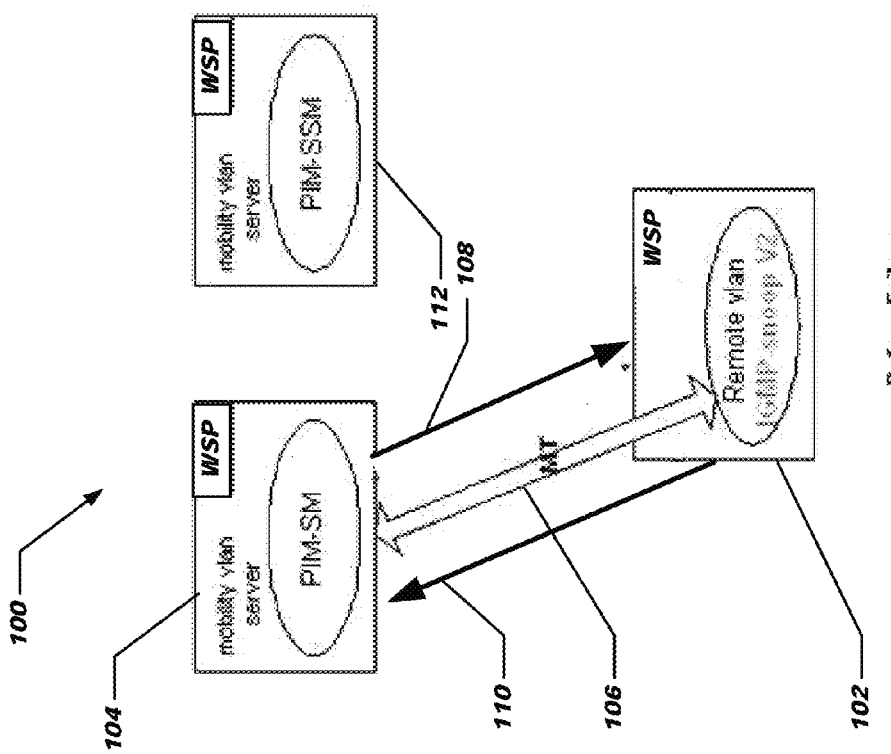

Referring now to FIGS. 3A and 3B, environments 100 and 150 are shown wherein the IGMP snoop version is automatically adjusted to match the version of PIM. The versions of IGMP snoop and the version of PIM must be the same, or else the IGMP query and IGMP reports functionality will not operate properly.

Referring to FIG. 3A, environment 100 shows a first WSP 102 in communication with a second WSP 102 by way of MT 106. In this case the IGMP snoop version on Remote Vlan is determined by the PIM version on mobility VLAN server. Upon receiving IGMP queries from mobility VLAN server via MT, Remote Vlan will check the query version and adjust its IGMP snoop version to be the same as the PIM version running on mobility VLAN server. Here, an IGMP query (version 2) 108 is sent over MT 106 from WSP 104 and is received by WSP 102. WSP 102 is running IGMP version 2, and so can accept the query 108 and respond to the query 108 with an IGMP report 110.

Referring now to FIG. 3B, a similar environment as that of FIG. 3A is shown, however while FIG. 3A shows the environment before a failover event, FIG. 3B shows an environment after the failover event. In case of mobility VLAN server failover, the Remote VLAN will follow the above rule to change its IGMP snoop version; so that its IGMP snoop will be in sync with its new mobility VLAN server. Here WSP 104 has failed and MT 106 is taken down. WSP 102 has transitioned to communication with WSP 112. An MT 152 is built between WSP 112 and WSP 102. The IGMP query from WSP 112 to WSP 102 contains the version number, so that the WSP 102 can automatically change it's version number to match. While WSP 102 was previously running IMGP version 2 in FIG. 3A it now must change its IGMP version to version 3 in order to function properly with the PIM version running on WSP 112.

As described above, the existing Split Plane WLAN solution only supports IGMP snooping on the VLANs that serve mobility. It depends on other PIM enabled routers to bring WSPs into users' existing PIM network, whereas the presently described method and apparatus for providing IP multicast over split plane wireless LAN allows PIM to be enabled on WSP router and the VLANs the sever mobility.

The presently described method and apparatus providing IP multicast over spit plane wireless LAN provides several benefits not available with conventional systems and techniques. There is no need to modify existing IP multicast network or configuration. Once mobility support is enabled on WSP, PIM protocol will be automatically extended to wireless tunnel. In order to support multicast for wireless roaming, no extra configuration is needed. Multicast support will be automatically enabled on Remote VLANs, which work as an agent between wireless clients and wireless VLAN servers. Remote VLANs can automatically adjust its IGMP version to match the VLAN servers' PIM version, so that all versions of PIM protocols can be supported without network administrators' intervention.

Figure 4:
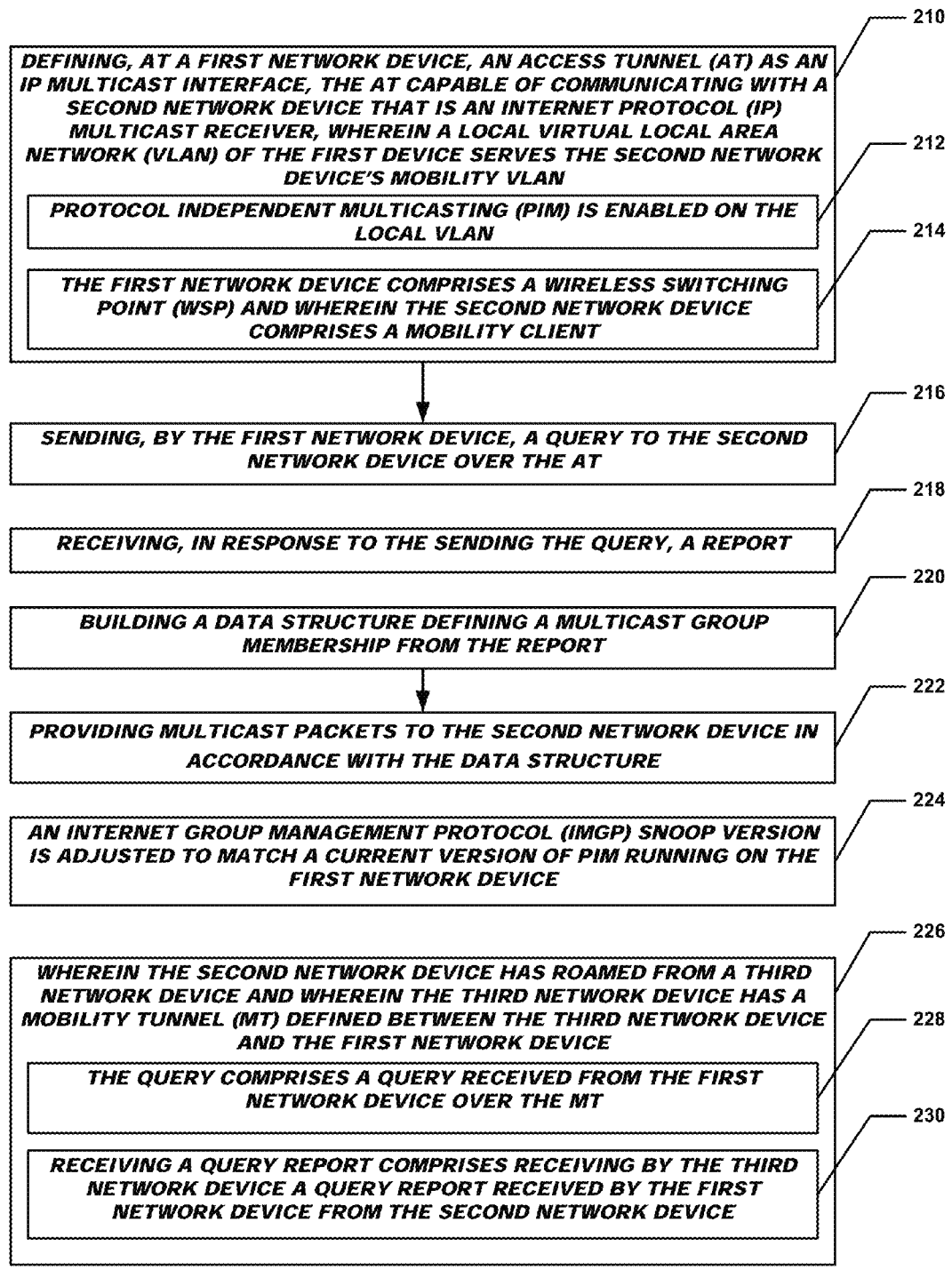
FIG. 4 illustrates a flow diagram of a particular method for providing IP multicast over split plane wireless LAN in accordance with embodiments of the invention.

A flow chart of a particular embodiment of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 200 for providing IP multicast over split plane wireless LAN is shown. Method 200 begins with processing block 210 which discloses defining, at a first network device, an access tunnel (AT) as an IP multicast interface, the AT capable of communicating with a second network device that is an Internet Protocol (IP) multicast receiver, wherein a local Virtual Local Area Network (VLAN) the first device serves the second network device's mobility VLAN. Processing block 212 states Protocol Independent Multicasting (PIM) is enabled on the local VLAN.

Processing block 214 recites wherein the first network device comprises a Wireless Switching Point (WSP) and wherein the second device comprises a mobility client. Processing block 216 discloses sending, by the first network device, a query to the second network device over the AT.

Processing block 218 states receiving, in response to the sending the query, a report. Processing block 220 recites building a data structure defining a multicast group membership from the report. Processing block 222 discloses providing multicast packets to the second network device in accordance with the data structure.

Processing block 224 states wherein an Internet Group Management Protocol (IMGP) snoop version is adjusted to match a current version of PIM running on the first network device.

In a particular embodiment mobile device roaming is supported by the addition of processing blocks 226, 228 and 230. Processing block 226 discloses wherein the defining further comprises wherein the second network device has roamed from a third network device and wherein the third network device has a Mobility Tunnel (MT) defined between the third network device and the first network device.

Processing block 228 states wherein the query comprises a query received from the first device over the MT. Processing block 230 recites wherein the receiving a query report comprises receiving by the third network device a query report received by the first device from the second device.

Figure 5:
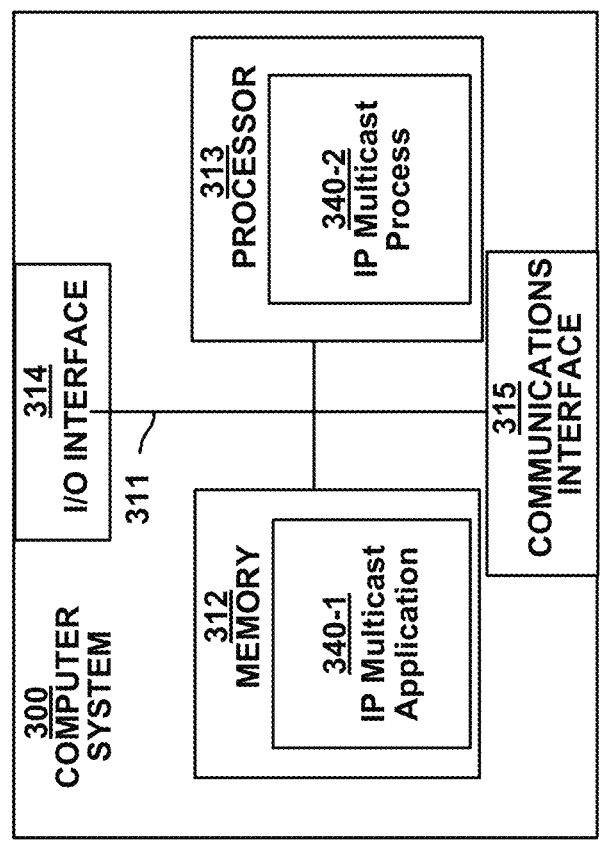
FIG. 5 illustrates an example computer system architecture for a computer system such as a WSP that provides IP multicast over split plane wireless LAN in accordance with embodiments of the invention.

FIG. 5 is a block diagram illustrating example architecture of a computer system 110 that executes, runs, interprets, operates or otherwise performs an IP multicast over split plane wireless LAN application 140-1 (referred to with respect to FIG. 5 as simply IP multicast application) and an IP multicast over split plane wireless LAN process 140-2 (referred to with respect to FIG. 5 as simply IP multicast process) suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the an IP multicast over split plane wireless LAN application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an IP multicast over split plane wireless LAN application 140-1 as explained herein. The an IP multicast over split plane wireless LAN application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of an IP multicast over split plane wireless LAN application 140-1. Execution of an IP multicast over split plane wireless LAN application 140-1 in this manner produces processing functionality in the IP multicast over split plane wireless LAN process 140-2. In other words, the an IP multicast over split plane wireless LAN process 140-2 represents one or more portions or runtime instances of an IP multicast over split plane wireless LAN application 140-1 (or the entire an IP multicast over split plane wireless LAN application 140-1) performing or executing within or upon the processor 113 in the computerized device 110 at runtime.

It is noted that example configurations disclosed herein include the IP multicast over split plane wireless LAN application 140-1 itself (i.e., in the form of un-executed or non-performing logic instructions and/or data). The an IP multicast over split plane wireless LAN application 140-1 may be stored on a computer readable medium (such as a floppy disk), hard disk, electronic, magnetic, optical, or other computer readable medium. A an IP multicast over split plane wireless LAN application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of an IP multicast over split plane wireless LAN application 140-1 in the processor 113 as the an IP multicast over split plane wireless LAN process 140-2. Those skilled in the art will understand that the computer system 110 may include other processes and/or software and hardware components, such as an operating system not shown in this example.

A display 130 need not be coupled directly to computer system 110. For example, the IP multicast over split plane wireless LAN application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the IP multicast over split plane wireless LAN application 140-1. Execution of IP multicast over split plane wireless LAN application 140-1 produces processing functionality in IP multicast over split plane wireless LAN process 140-2. In other words, the IP multicast over split plane wireless LAN process 140-2 represents one or more portions of the IP multicast over split plane wireless LAN application 140-1 (or the entire application) performing within or upon the processor 113 in the computer system 100.

It should be noted that, in addition to the IP multicast over split plane wireless LAN process 140-2, embodiments herein include the IP multicast over split plane wireless LAN application 140-1 itself (i.e., the un-executed or non-performing logic instructions and/or data). The IP multicast over split plane wireless LAN application 140-1 can be stored on a computer readable medium such as a floppy disk, hard disk, or optical medium. The IP multicast over split plane wireless LAN application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of IP multicast over split plane wireless LAN application 140-1 in processor 113 as the IP multicast over split plane wireless LAN process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
    defining, at a first network device, an access tunnel (AT) as an IP multicast interface, said AT capable of communicating with a second network device that is an Internet Protocol (IP) multicast receiver, wherein a local Virtual Local Area Network (VLAN) on said first network device serves said second network device's mobility VLAN, wherein Protocol Independent Multicasting (PIM) is enabled on said local VLAN;
    sending, by said first network device, a query to said second network device over said AT;
    receiving, in response to said sending said query, a report including multicast group membership;
    building a data structure defining a multicast group membership from said report;
    wherein an Internet Group Management Protocol (IGMP) snoop version is adjusted to match a current version of PIM running on said first network device; and
    wherein said first network device comprises a Wireless Switching Point (WSP) that does not have wireless LAN control functionality and wherein said second network device comprises a mobility client.

2. The method of claim 1 further comprising providing multicast packets to said second network device in accordance with said data structure.

3. The method of claim 1 wherein said defining further comprises wherein said second network device has roamed from a third network device and wherein said third network device has a Mobility Tunnel (MT) defined between said third network device and said first network device.

4. The method of claim 3 wherein said query further comprises a query received by said third network device from said first network device over said MT.

5. The method of claim 4 wherein said receiving a query report comprises receiving by said third network device a query report received by said first network device from said second network device.

6. The method of claim 1 wherein said IGMP version is adjusted to match the VLAN servers' PIM version so that all versions of PIM protocols can be supported without network administrators' intervention.

7. A non-transitory computer readable storage medium having computer readable code thereon for providing IP multicast over a Split Plane Wireless LAN, the medium including instructions in which a computer system performs operations comprising:
defining, at a first network device, an access tunnel (AT) as an IP multicast interface, said AT capable of communicating with a second network device that is an Internet Protocol (IP) multicast receiver, wherein a local Virtual Local Area Network (VLAN) on said first network device serves said second network device's mobility VLAN, wherein Protocol Independent Multicasting (PIM) is enabled on said local VLAN;
sending, by said first network device, a query to said second network device over said AT;
receiving, in response to said sending said query, a report including multicast group membership;
building a data structure defining a multicast group membership from said report;
wherein an Internet Group Management Protocol (IGMP) snoop version is adjusted to match a current version of PIM running on said first network device; and
wherein said first network device comprises a Wireless Switching Point (WSP) that does not have wireless LAN control functionality and wherein said second network device comprises a mobility client.

8. The non-transitory computer readable storage medium of claim 7 further comprising providing multicast packets to said second network device in accordance with said data structure.

9. The non-transitory computer readable storage medium of claim 7 wherein said defining further comprises wherein said second network device has roamed from a third network device and wherein said third network device has a Mobility Tunnel (MT) defined between said third network device and said first network device.

10. The non-transitory computer readable storage medium of claim 9 wherein said query further comprises a query received by said third network device from said first network device over said MT.

11. The non-transitory computer readable storage medium of claim 10 wherein said receiving a query report comprises receiving by said third network device a query report received by said first network device from said second network device.

12. The compute readable storage medium of claim 7 wherein said IGMP version is adjusted to match the VLAN servers' PIM version so that all versions of PIM protocols can be supported without network administrators' intervention.

13. A computer system including at least one network device, each of said at least one network device comprising:
a memory;
a processor;
a communications interface;
an interconnection mechanism coupling the memory, the processor and the communications interface; and
wherein the memory is encoded with an application providing IP multicast over a Split Plane Wireless LAN, that when performed on the processor, provides a process for processing information, the process causing the computer system to perform the operations of:
defining, at a first network device, an access tunnel (AT) as an IP multicast interface, said AT capable of communicating with a second network device that is an Internet Protocol (IP) multicast receiver, wherein a local Virtual Local Area Network (VLAN) on said first network device serves said second network device's mobility VLAN, wherein Protocol Independent Multicasting (PIM) is enabled on said local VLAN;
sending, by said first network device, a query to said second network device over said AT;
receiving, in response to said sending said query, a report including multicast group membership;
building a data structure defining a multicast group membership from said report;
wherein an Internet Group Management Protocol (IGMP) snoop version is adjusted to match a current version of PIM running on said first network device; and
wherein said first network device comprises a Wireless Switching Point (WSP) that does not have wireless LAN control functionality and wherein said second network device comprises a mobility client.

14. The computer system of claim 13 further comprising the operation of providing multicast packets to said second network device in accordance with said data structure.

15. The computer system of claim 13 wherein said defining further comprises wherein said second network device has roamed from a third network device and wherein said third network device has a Mobility Tunnel (MT) defined between said third network device and said first network device.

16. The computer system of claim 15 wherein said query further comprises a query received from said first network device by said third network device over said MT and wherein said receiving a query report comprises receiving by said third network device a query report received by said first network device from said second network device.

17. The computer system of claim 13 wherein said IGMP version is adjusted to match the VLAN servers' PIM version so that all versions of PIM protocols can be supported without network administrators' intervention.

* * * * *